United States Patent [19]

Toyomasu et al.

[11] Patent Number: 5,003,129
[45] Date of Patent: Mar. 26, 1991

[54] PROTECTING STRUCTURE FOR HARNESS WIRED ALONG TELESCOPIC STEERING COLUMN

[75] Inventors: Shunichi Toyomasu; Kazuyuki Mori, both of Kanagawa, Japan

[73] Assignee: Nissan Motor Company, Ltd., Japan

[21] Appl. No.: 531,382

[22] Filed: Jun. 1, 1990

[30] Foreign Application Priority Data

Jun. 2, 1989 [JP] Japan .................................. 1-141355

[51] Int. Cl.$^5$ .......................... B60R 16/02; B62D 1/18
[52] U.S. Cl. ........................................ 174/69; 74/493;
174/70 R; 174/72 A; 174/136
[58] Field of Search ...................... 174/69, 70 R, 71 R,
174/72 R, 72 A, 91, 136; 74/493; 280/775, 777;
439/15, 32, 33, 34

[56] References Cited
FOREIGN PATENT DOCUMENTS
63-32527 8/1988 Japan .

Primary Examiner—Laramie E. Askin
Attorney, Agent, or Firm—Lowe, Price, LeBlanc, Becker & Shur

[57] ABSTRACT

A protecting structure for a harness arranged over stationary and movable sides of a telescopic steering column comprises a flat, wide harness protector for protecting the harness. The harness protector includes a pair of openings opposing each other in its longitudinal direction to introduce the harness thereinto or to extract the harness therefrom. The harness protector is in itself constructed to telescopically move according to telescopic motion of the steering column when the harness protector is arranged over both of the stationary and movable sides of the steering column. The harness protector includes a harness guide provided midway therebetween for defining two branch harness passageways converged towards the openings to arrange the harness in such a manner as to branch the harness into two harness sections in its transverse direction, thereby allowing the two branched harness sections to move inwardly or outwardly in a transverse direction according to the telescopic motion of the steering column.

8 Claims, 2 Drawing Sheets

PROTECTING STRUCTURE FOR HARNESS WIRED ALONG TELESCOPIC STEERING COLUMN

BACKGROUND OF THE INVENTION

1. Field of the Invention

The present invention relates to a harness protecting structure which is optimally adapted for use with a telescopic steering column capable of adjusting steering wheel elevation to obtain an optimal driving position.

2. Description of the Prior Disclosure

Recently, there have been proposed and developed various protecting structures for a harness arranged along a telescopic steering column, such harnesses generally comprise a plurality of lead wires, such as horn and switch wires, wires employed for an air-bag system and the like. As is generally known, such harness protecting structures are designed in such a manner as to assure protection of the harness, and to absorb expansion/contraction of the harness occurring according to telescopic motion of the steering column, and in addition to organize complicated wiring along the steering column.

One such conventional protecting structure for a harness arranged on the outer periphery of a telescopic steering column has been disclosed in Japanese Utility Model Second Publication (Jikko Showa) NO. 63-32527. Such a conventional harness protecting structure for a telescopic steering column includes a harness housing provided beneath a combination switch assembly attached to the steering column, for operably accommodating an intermediate helically arranged steering harness section in a manner so as to increase or decrease a diameter of the helical harness section in accordance with telescopic motion of the steering column. The harness housing includes a partition wall for defining a helical passageway for the helical harness section, in combination with the inner wall of the housing. The partition wall is also provided to regulatingly guide the helical harness section in the harness housing. In the conventional harness protecting structure as previously described, since at least one turned intermediate helical harness section having a relatively large diameter (and consequently a relatively large rigidity) is helically accommodated in the harness housing through the partition wall, the outer peripheral surface of the helical harness section contacts the inner peripheral surface of the harness housing and the partition wall with a relatively large contact surface. Under such a helically accommodated state of the intermediate steering harness section, a relatively large torsional stress continuously occurs at the harness section and abrasion occurs at the contact surface during telescopic motion of the steering column. In addition, flexibility of the helical harness section is lowered due to its relatively high rigidity. Therefore, the life of the helical harness section may be reduced.

Furthermore, the conventional steering harness protecting structure provides a relatively great thickness towards the knees of the driver due to its helical structure. That is, a relatively great thickness of protecting structure is required for helically accommodating the harness section. As a result, knee space of the driver is reduced.

SUMMARY OF THE INVENTION

It is, therefore in view of the above disadvantages, an object of the present invention to provide a protecting structure for a harness arranged on a telescopic steering column, which can reduce undesirable stress occurring at the steering harness during telescopic motion of the steering column.

It is another object of the invention to provide a harness protecting structure for a telescopic steering column to allow smooth telescopic motion of the steering column and high responsiveness of the harness protector according to telescopic motion of the steering column.

It is a further object of the invention to provide a harness protecting structure for a telescopic steering column allowing a relatively large amount of knee space for a vehicle driver.

In order to accomplish the aforementioned and other objects, a protecting structure for a harness arranged over a stationary member and a movable member comprises a substantially flat harness protector for protecting the harness. The harness protector includes a pair of openings opposing each other in its longitudinal direction to introduce the harness thereinto or to extract the harness therefrom, means for allowing the harness protector to expandably move essentially in the longitudinal direction when the harness protector is arranged over both of the stationary member and the movable member, and a harness guide for defining two branch harness passageways converged towards the openings to arrange the harness in such a manner as to branch the harness into two harness sections in its transverse direction, thereby allowing the two branched harness sections to move inwardly or outwardly in the transverse direction according to a relative movement between the stationary member and the movable member.

According to another aspect of the invention, a protecting structure for a harness arranged over a stationary and a movable side of a telescopic steering column comprises a substantially flat harness protector for protecting the harness. The harness protector includes a pair of openings opposing each other in its longitudinal direction to introduce the harness thereinto or to extract the harness therefrom. The harness protector includes means for allowing the harness protector to telescopically move essentially in an axial direction of the steering column according to telescopic motion of the steering column when the harness protector is arranged over both of the stationary and movable sides of the steering column. The harness protector also includes a harness guide for defining two branch harness passageways converged towards the openings to arrange the harness in such a manner as to branch the harness into two harness sections in its transverse direction, thereby allowing the two branched harness sections to move inwardly or outwardly in the transverse direction according to the telescopic motion of the steering column. The means for allowing the harness protector to telescopically move may include a pair of telescoping portions defining the two branch harness passageways for the two branched harness sections. Preferably, the pair of telescoping portions are arranged such that one may fit into the other while the surfaces thereof remain substantially parallel to each other to allow sliding movement of the movable harness casing. To provide smooth deflection of the two branched harness sections in the transverse direction, the openings may be directed substantially in the axial direction of the steering column. The harness guide may be provided along a longitudinal axis of the harness protector. Preferably, the harness protector may be substantially symmetrical with regard to the longitudinal axis.

According to a further aspect of the invention, a protecting structure for a harness arranged over a stationary and a movable side of a telescopic steering column comprises a substantially flat stationary harness casing attached to the stationary side of the steering column for protecting the harness and a substantially flat movable harness casing attached to the movable side of the steering column for protecting the harness. The stationary harness casing includes a first confluent casing section having a first opening passing the harness and a pair of first branch casing sections branched from the first confluent casing section, while the movable harness casing includes a second confluent casing section having a second opening passing the harness and a pair of second branch casing sections branched from the second confluent casing section. Each of the first branch casing sections has a first communication opening, while each of the second branch casing sections has a second communication opening. The first branch casing sections respectively engage telescopically with the second branch casing sections through the first or second communication openings essentially in an axial direction of the steering column to allow sliding movement of the movable harness casing according to telescopic motion of the steering column. The first and second branch casing sections cooperatingly define two branch harness passageways converged towards the first and second openings to arrange the harness in such a manner as to branch the harness into two harness sections in a transverse direction of the engaged harness casings, thereby allowing the two branched harness sections to move inwardly or outwardly in the transverse direction. The telescopically engaging portions between the first branch casing sections and the second branch casing sections may be arranged such that one may fit into the other while the surfaces thereof remain substantially parallel to each other to allow the sliding movement of the movable harness casing. The first and second openings and the first and second communication openings may be directed in the axial direction of the steering column. The engaged harness casings may be preferably symmetrical with regard to their longitudinal axis to provide smooth deflection of the two branched harness sections in the transverse direction.

DESCRIPTION OF THE PREFERRED EMBODIMENT

Figure 1:
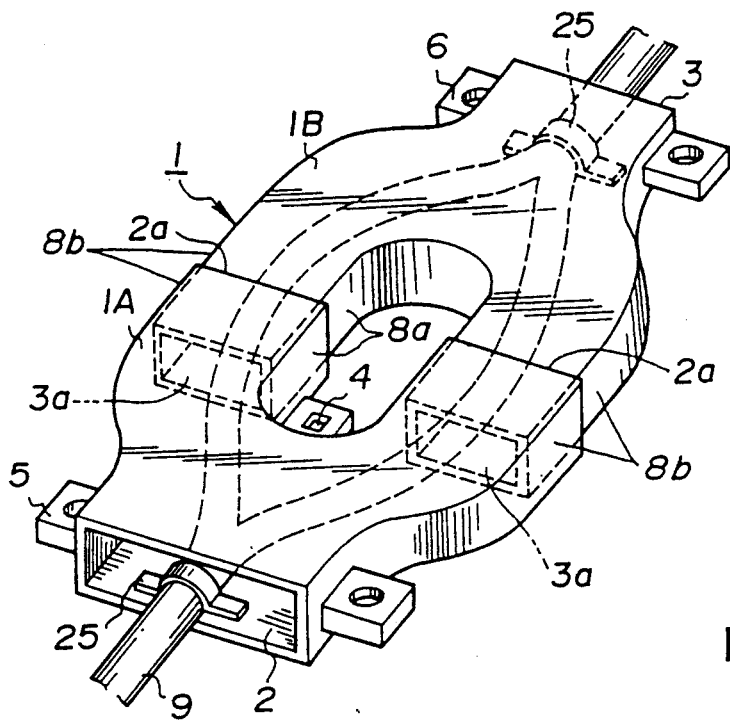
FIG. 1 is a perspective view illustrating a harness protecting structure for a telescopic steering column according to the present invention, under an extended state of the steering column.
Figure 2:
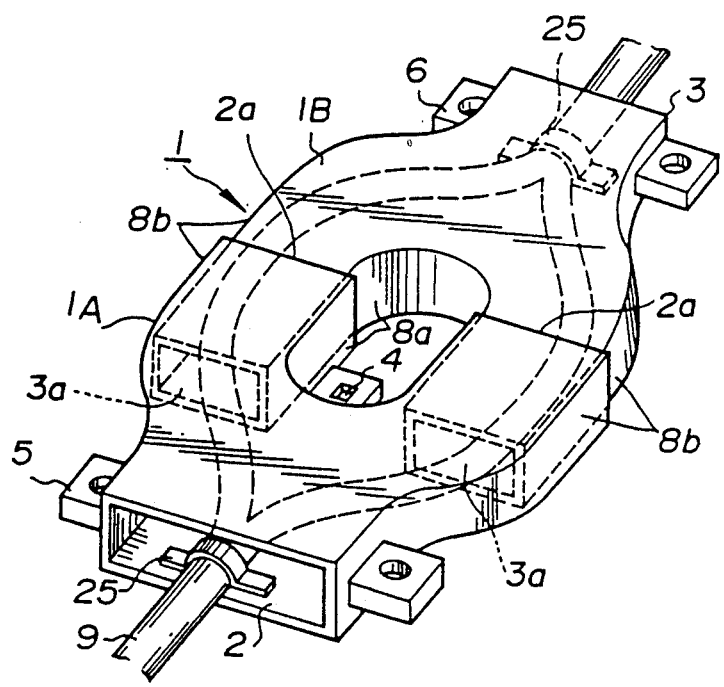
FIG. 2 is a perspective view illustrating a harness protecting structure for a telescopic steering column according to the invention, under a compressed state of the steering column.
Figure 3:
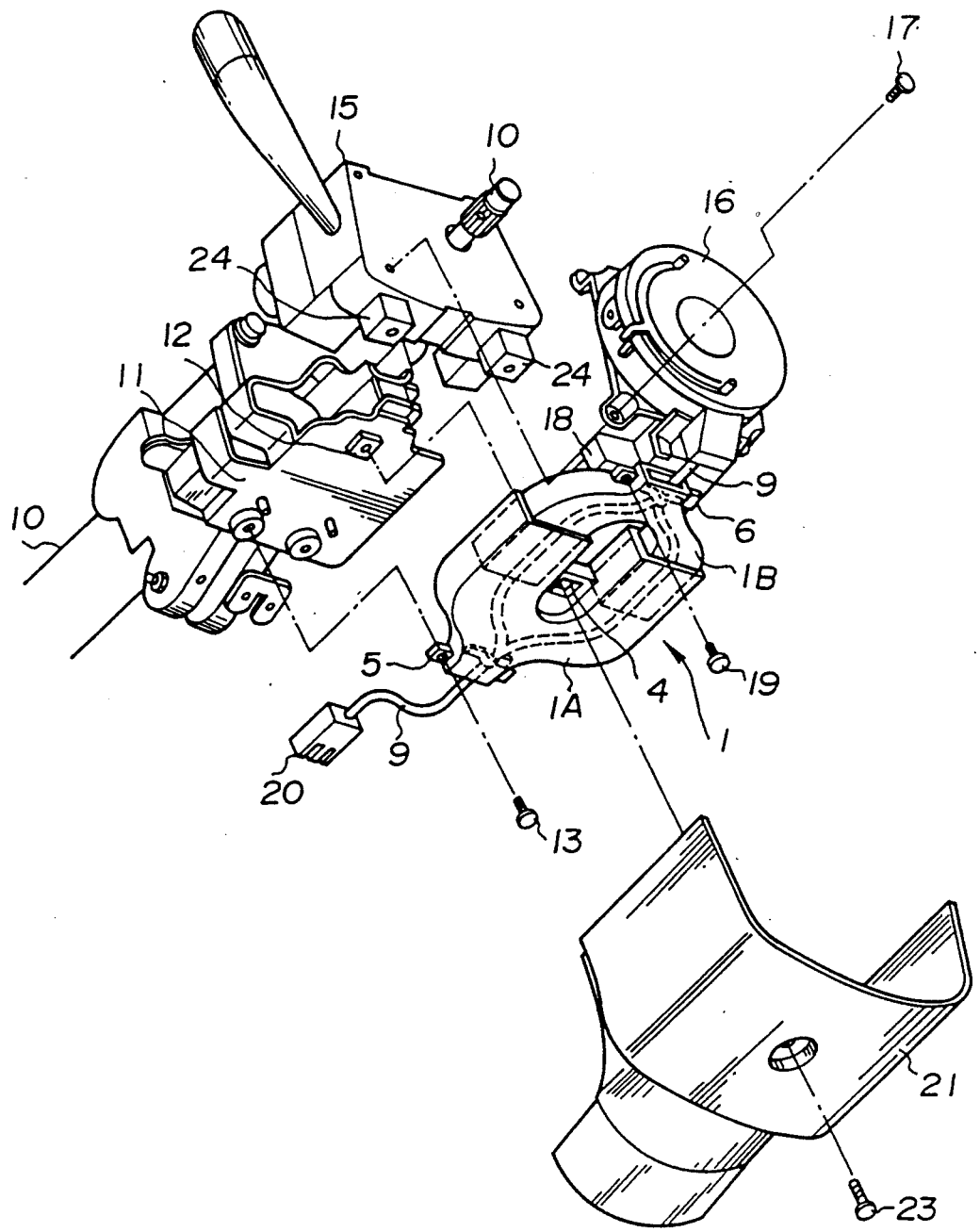
FIG. 3 is an exploded perspective view illustrating the installation relationship between a telescopic steering column assembly and a steering harness protector according to the invention.

Referring now to FIGS. 1, 2 and 3, a flat, wide harness protector 1 is provided for protecting a harness arranged along a telescopic steering column 10 as shown in FIG. 3. The harness protector 1 is composed of a stationary harness casing 1A and a movable harness casing 1B. The stationary harness casing 1A includes a confluent section having a relatively large opening 2 for passing a harness 9 therethrough and a pair of substantially parallel branch sections respectively having a pair of openings 2a faced apart from the opening 2. The parallel branch sections (included in the stationary harness casing 1A) define two harness passageways branched from the opening 2. A shape of the movable harness casing 1B is extremely similar to that of the stationary harness casing 1A. The movable harness casing 1B also includes a confluent section having a substantially rectangular opening 3 for passing the harness 9 therethrough and a pair of substantially parallel branch sections respectively having a pair of substantially rectangular openings 3a facing away from the opening 3. The parallel branch sections of the movable harness section 1B define two harness passageways forked from the opening 3. As clearly seen in FIGS. 1 and 2, the parallel branch sections included in the movable harness casing 1B are telescopically fitted through the openings 2a into the parallel branch sections included in the stationary harness casing 1A. In the preferred embodiment, the branch sections included in the movable harness casing 1B are telescopically fitted into the branch sections included in the stationary harness casing 1A or vice versa. The stationary harness casing 1A also includes three brackets, namely a bracket 4 attached to the center concavity substantially midway between the two parallel branch sections, and a pair of brackets 5 attached to both sides of the confluent section. On the other hand, the movable harness casing 1B includes a pair of brackets 6 attached to both sides of the confluent section.

As shown in FIG. 3, the stationary harness casing 1A is positioned via the bracket 4 on a substantially flat mounting seat 11 fixed to the lower stationary side of the steering column 10 by fitting a boss 12 projecting from the flat seat 11 into a hole bored in the center of the bracket 4. The stationary harness casing 1A is further secured via the brackets 5 to the flat seat 11 by means of screws 13. Preferably, the boss 12 and the associated hole of the bracket 4 may be non-circular, for example square, so as to prevent rotational movement of the protector 1 relative to the steering column 10 during initial mounting of the protector 1 during installation. On the other hand, the movable harness casing 1B is secured via the brackets 6 to the upper movable side of the steering column 10 by means of screws 19 as detailed in FIG. 3. Therefore, the movable harness casing 1B is movable along with the upper movable side of the steering column 10, while the stationary harness casing 1A is securely fixed on the lower stationary side of the steering column 10.

As set forth above, the protector 1 is telescopically mounted on the steering column 10 in a manner so as to bridge between the upper movable side of the steering column 10 and the lower stationary side of the steering column 10. As seen in FIGS. 1 and 2, all of the openings 2, 2a, 3 and 3a are directed substantially in the axial direction of the steering column 10 to assure smooth telescopic motion of the harness protector 1 and the steering column 10. The harness 9 is partially branched into two harness sections respectively arranged along intermediate branch harness passageways defined in the harness casings 1A and 1B such that the harness 9 is converged in the confluent sections of the harness casings 1A and 1B and is branched in the branch sections of the harness casings. As will be appreciated from FIGS. 1 and 2, respectively illustrating extended and compressed states of the harness protector 1, the two branched harness sections are shifted to be arranged in close proximity to the inner side walls 8a of the branch sections of the harness casings 1A and 1B under an extended condition of the steering column 10 (see FIG. 1) and while the two branched harness sections are shifted to be arranged in close proximity to the outer side walls 8b under a compressed condition of the steering column 10 (see FIG. 2). Since the two branched harness sections are initially positioned substantially in the center of the harness guide passages defined by the branch members of the harness casings 1A and 1B, there is sufficient slack in the harness 9 that it will not be damaged or stressed whether the harness casing is fully compressed or fully expanded.

The harness 9 is clamped to the inner wall of each confluent section of the harness casing 1A and 1B in the vicinity of the openings 2 and 3 by clamps 25, with the result that only the two branched harness sections (having relatively great flexibility in comparison with the single, non-branched harness section) can be flexibly and smoothly deformed in a direction perpendicular to the axis of the steering column 10 so as to assure smooth telescopic motion of the steering column 10. To provide higher responsiveness of the steering harness protector 1 according to telescopic motion of the steering column 10, it is desirable that the subassembly of the two harness casings 1A and 1B is symmetrical with regard to its longitudinal axis and that the longitudinal axis is arranged parallel with that of the steering column 10 when the protector 1 is mounted on the steering column 10.

The end of the harness 9 exposed from the opening 2 of the stationary harness casing 1A is connected through a connector 20 to a positive terminal of an electrical power source, such as a battery. While, the end of the harness 9 exposed from the opening 3 of the movable harness casing 1B is connected to electrical devices attached to a steering wheel, for instance a horn switch and an air-bag system. For this reason, a portion of the harness 9 exposed from the opening 3 is windingly received in a harness reel 16 secured to the upper surface of a combination switch assembly 15 by means of screws 17. The harness reel 16 is provided for winding or unwinding of the harness 9 in accordance with rotational movement of the steering wheel. The harness reel 16 is normally biased in its winding direction by means of a spring to allow the harness to wind automatically, preventing unnecessary slack in the harness. As is generally known, the combination switch assembly 15 includes a wiper and washer switch, a turn signal switch, and a lighting switch. The combination switch assembly 15 is attached to the upper movable member of the steering column 10 so as to rotate along with the steering wheel. A bracket 18 is integrally formed on the bottom of the harness reel 16 to secure the brackets 6 of the movable harness casing 1B thereto by means of screws 19. Reference numeral 21 denotes a lower steering column cover. The lower steering column cover 21 and the stationary harness casing 1A are both fixed on the flat seat 11 together by means of a screw 23. Although it is not shown in the drawings, an upper steering column cover is secured to bosses 24 integrally formed on the outer peripheral surface of the combination switch assembly 15 also by means of screws.

In the previously described harness protecting structure according to the invention, since only the two branched harness sections having a relatively high flexibility are slightly deformed in the perpendicular direction relative to the axis of the steering column 10 according to the telescopic motion of the steering column 10, bending or compressive stress occurring at the branched harness sections is relatively small. As is well known, since the harness is composed of plural lead wires, it is not as strongly affected by compressive or bending stress as by torsional stress. The harness protecting structure according to the invention will ensure a long life to the harness. In addition, the dimensions of the harness protector can be designed such that a width of the branched harness passageway is set to the very minimum value allowing deflection of the branched harness section in directions perpendicular to the axis of the telescopic steering column and a thickness of the protector may be set to a value substantially equal to the diameter of the non-branched section of the harness. Therefore, a flat, wide harness protector according to the invention can provide a relatively large amount of knee space for a driver.

Although the harness protector described in the preferred embodiment is a two-split type harness protecting structure constructed of two similarly shaped harness casings engaged telescopically with each other, an integrally formed, substantially O-shaped harness protector, which includes a pair of accordion-like sections defining two branched steering harness passages and a pair of openings opposing each other for introducing or extracting the steering harness may be used as a telescopic steering harness protector having a high responsiveness according to telescopic motion of the steering column.

While the foregoing is a description of the preferred embodiment for carrying out the invention, it will be understood that the invention is not limited to the particular embodiment shown and described herein, but may include variations and modifications without departing from the scope or spirit of this invention as described by the following claims.

What is claimed is:

1. A protecting structure for a harness arranged over a stationary member and a movable member comprising:

a substantially flat harness protector for protecting said harness;

said harness protector including:

a pair of openings opposing each other in its longitudinal direction to introduce said harness thereinto or to extract said harness therefrom;

means for allowing said harness protector to expandably move essentially in the longitudinal direction when said harness protector is arranged over both of the stationary member and the movable member; and a harness guide for defining two branch harness passageways converged towards the openings to arrange said harness in such a manner as to branch said harness into two harness sections in its transverse direction, thereby allowing the two branched harness sections to move inwardly or outwardly in the transverse direction according to a relative movement between the stationary member and the movable member.

2. A protecting structure for a harness arranged over a stationary and a movable side of a telescopic steering column comprising:

a substantially flat harness protector for protecting said harness;

said harness protector including:

a pair of openings opposing each other in its longitudinal direction to introduce said harness thereinto or to extract said harness therefrom;

means for allowing said harness protector to expandably move essentially in an axial direction of the steering column according to telescopic motion of the steering column when said harness protector is arranged over both of the stationary and movable sides of the steering column; and a harness guide for defining two branch harness passageways converged towards the openings to arrange said harness in such a manner as to branch said harness into two harness sections in its transverse direction, thereby allowing the two branched harness sections to move inwardly or outwardly in the transverse direction according to the telescopic motion of the steering column.

3. The protecting structure as set forth in claim 2, wherein said means for allowing said harness protector to telescopically move, includes a pair of telescoping portions defining said two branch harness passageways for the two branched harness sections.

4. The protecting structure as set forth in claim 3, wherein the pair of telescoping portions are arranged such that one fits into the other while the surfaces thereof remain substantially parallel to each other to allow sliding movement of said movable harness casing.

5. The protecting structure as set forth in claim 2, wherein said openings are directed substantially in the axial direction of the harness protector and said harness guide is provided along a longitudinal axis of said harness protector and said harness protector is substantially symmetrical with regard to the longitudinal axis, so as to provide smooth deflection of the two branched harness sections in the transverse direction.

6. A protecting structure in combination with a harness arranged over a stationary and a movable side of a telescopic steering column comprising:

a substantially flat stationary harness casing attached to the stationary side of the steering column for protecting said harness, said stationary harness casing including a first confluent casing section having a first opening passing said harness and a pair of first branch casing sections branched from the first confluent casing section, each of said first branch casing sections having a first communication opening;

a substantially flat movable harness casing attached to the movable side of the steering column for protecting said harness, said movable harness casing including a second confluent casing section having a second opening passing said harness and a pair of second branch casing sections branched from the second confluent casing section, each of said second branch casing sections having a second communication opening; and said first branch casing sections telescopically engaging with said second branch casing sections through said first or second communication openings essentially in an axial direction of the steering column to allow sliding movement of the movable harness casing according to telescopic motion of the steering column, said first and second branch casing sections cooperatingly defining two branch harness passageways converged towards the first and second openings to arrange said harness in such a manner as to branch said harness into two harness sections in a transverse direction of the engaged harness casings, thereby allowing the two branched harness sections to move inwardly or outwardly in the transverse direction.

7. The combination as set forth in claim 6, wherein the telescopically engaging portions between said first branch casing sections and said second branch casing sections are arranged such that one fits into the other while the surfaces thereof remain substantially parallel to each other to allow sliding movement of said movable harness casing.

8. The combination as set forth in claim 7, wherein said first and second openings and said first and second communication openings are directed to the axial direction of the steering column and the engaged harness casings are substantially symmetrical with regard to their longitudinal axis to provide smooth deflection of the two branched harness sections in the transverse direction.

* * * * *

UNITED STATES PATENT AND TRADEMARK OFFICE
CERTIFICATE OF CORRECTION

PATENT NO. : 5,003,129
DATED : March 26, 1991
INVENTOR(S) : Shunichi TOYOMASU et al It is certified that error appears in the above-identified patent and that said Letters Patent is hereby corrected as shown below:

On the title page, item [73] should be:

Assignee: Nissan Motor Company, Ltd. and
                 Alps Electric Co., Ltd., both of Japan Signed and Sealed this Twenty-ninth Day of September, 1992

*Attest:*

DOUGLAS B. COMER

*Attesting Officer*           *Acting Commissioner of Patents and Trademarks*